(12) United States Patent
Alkove et al.

(10) Patent No.: US 10,475,010 B2
(45) Date of Patent: Nov. 12, 2019

(54) FEDERATED ENTERTAINMENT ACCESS SERVICE

(75) Inventors: James M. Alkove, Redmond, WA (US); Chadd B. Knowlton, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1494 days.

(21) Appl. No.: 11/972,612

(22) Filed: Jan. 10, 2008

(65) Prior Publication Data
US 2009/0182662 A1 Jul. 16, 2009

(51) Int. Cl.
*G06Q 20/12* (2012.01)
*G06F 21/10* (2013.01)
*G06Q 20/10* (2012.01)

(52) U.S. Cl.
CPC ......... *G06Q 20/1235* (2013.01); *G06F 21/10* (2013.01); *G06Q 20/102* (2013.01)

(58) Field of Classification Search
USPC .......................................................... 705/52
See application file for complete search history.

(56) References Cited

U.S. PATENT DOCUMENTS

| | | |
|---|---|---|
| 5,913,040 A | 6/1999 | Rakavy et al. |
| 6,366,956 B1 | 4/2002 | Krishnan |
| 6,513,117 B2 | 1/2003 | Tarpenning |
| 6,799,271 B2 | 9/2004 | Kugai |
| 6,804,659 B1 | 10/2004 | Graham et al. |
| 6,975,836 B2 | 12/2005 | Tashiro et al. |
| 7,076,244 B2 | 7/2006 | Lazaridis et al. |
| 7,103,574 B1 | 9/2006 | Peinado et al. |
| 7,130,829 B2 | 10/2006 | Banerjee et al. |
| 7,136,945 B2 | 11/2006 | Gibbs |
| 7,200,575 B2 | 4/2007 | Hans |
| 7,200,607 B2 | 4/2007 | Downs |
| 7,203,966 B2 | 4/2007 | Abburi et al. |
| 7,209,900 B2 | 4/2007 | Hunter et al. |
| 7,241,219 B2 | 7/2007 | Walker et al. |
| 7,272,628 B1 | 9/2007 | Pravetz et al. |
| 7,356,838 B2 | 4/2008 | Madison et al. |

(Continued)

FOREIGN PATENT DOCUMENTS

| | | |
|---|---|---|
| CN | 1606009 A | 4/2005 |
| CN | 101689283 | 3/2010 |

(Continued)

OTHER PUBLICATIONS

Subramanya et al., "Content Management Using Personal Content Portfolios", Consumer Communications and Networking Conference, 2006. CCNC 2006, vol. 1, IEEE, pp. 69-73.

(Continued)

*Primary Examiner* — Zeshan Qayyum
(74) *Attorney, Agent, or Firm* — Davin Chin; Chin IP, PLLC

(57) ABSTRACT

This document describes tools capable of managing digital content from multiple content providers based on a user's identity. By so doing, the tools may free people from the limitations of their storage media and devices. The tools may perform these and other actions through an indirect relationship with users, such as when third-party content providers use the tools but provide their own direct interface with users.

12 Claims, 10 Drawing Sheets

(56) References Cited

U.S. PATENT DOCUMENTS

| | | |
|---|---|---|
| 7,395,049 B2 | 7/2008 | Piikivi |
| 7,430,598 B2 | 9/2008 | Raden et al. |
| 7,483,988 B2 | 1/2009 | Ono |
| 7,548,960 B2 | 6/2009 | Kang et al. |
| 7,631,323 B1 | 12/2009 | Green et al. |
| 8,112,311 B2 | 2/2012 | Hunter et al. |
| 2001/0056371 A1 | 12/2001 | Shuster |
| 2002/0016846 A1 | 2/2002 | Ono |
| 2002/0062393 A1 | 5/2002 | Borger et al. |
| 2002/0099790 A1 | 7/2002 | Mosher et al. |
| 2002/0124249 A1 | 9/2002 | Shintani et al. |
| 2002/0188725 A1 | 12/2002 | Mani |
| 2003/0003899 A1 | 1/2003 | Tashiro et al. |
| 2003/0018521 A1 | 1/2003 | Kraft et al. |
| 2003/0018767 A1 | 1/2003 | Chatani et al. |
| 2003/0065745 A1 | 4/2003 | Wolfe et al. |
| 2003/0088647 A1 | 5/2003 | ShamRao |
| 2003/0105669 A1 | 6/2003 | Tsuchiya |
| 2003/0167307 A1 | 9/2003 | Filepp et al. |
| 2003/0216963 A1 | 11/2003 | Ishiwaka et al. |
| 2003/0221127 A1 | 11/2003 | Risan et al. |
| 2004/0003139 A1 | 1/2004 | Cottrille |
| 2004/0010602 A1 | 1/2004 | Van Vleck et al. |
| 2004/0030643 A1 | 2/2004 | Madison et al. |
| 2004/0128499 A1 | 7/2004 | Peterka et al. |
| 2004/0133448 A1 | 7/2004 | Higashi et al. |
| 2004/0139207 A1 | 7/2004 | de Jong |
| 2004/0162787 A1 | 8/2004 | Madison et al. |
| 2004/0203648 A1* | 10/2004 | Wong ............ H04W 4/18 455/414.1 |
| 2005/0049886 A1 | 3/2005 | Grannan et al. |
| 2005/0071418 A1* | 3/2005 | Kjellberg ............ G06Q 20/123 709/200 |
| 2005/0091507 A1 | 4/2005 | Lee |
| 2005/0138357 A1 | 6/2005 | Swenson et al. |
| 2005/0154636 A1 | 7/2005 | Hildinger et al. |
| 2005/0193341 A1 | 9/2005 | Hayward et al. |
| 2005/0198545 A1 | 9/2005 | Wieck et al. |
| 2006/0059045 A1 | 3/2006 | Babbar et al. |
| 2006/0116924 A1* | 6/2006 | Angles ............ G06Q 30/02 705/14.56 |
| 2006/0123484 A1 | 6/2006 | Babic |
| 2006/0140150 A1 | 6/2006 | Olvera-Hernandez et al. |
| 2006/0230145 A1* | 10/2006 | Zarakhovsky et al. ....... 709/225 |
| 2006/0242262 A1 | 10/2006 | Riegler et al. |
| 2006/0242315 A1 | 10/2006 | Nichols |
| 2006/0277598 A1 | 12/2006 | Ahn |
| 2006/0294013 A1 | 12/2006 | Toshikage et al. |
| 2007/0050821 A1 | 3/2007 | Toshikage et al. |
| 2007/0055986 A1 | 3/2007 | Gilley et al. |
| 2007/0078712 A1 | 4/2007 | Ott, IV et al. |
| 2007/0088851 A1 | 4/2007 | Levkovitz et al. |
| 2007/0105571 A1 | 5/2007 | Choi et al. |
| 2007/0192277 A1 | 8/2007 | Jackson |
| 2007/0198339 A1 | 8/2007 | Shen et al. |
| 2007/0198430 A1 | 8/2007 | Takahashi et al. |
| 2007/0203841 A1 | 8/2007 | Maes |
| 2007/0204078 A1 | 8/2007 | Boccon-Gibod et al. |
| 2007/0220173 A1 | 9/2007 | Ohga et al. |
| 2007/0239874 A1 | 10/2007 | Lazaridis et al. |
| 2008/0028023 A1 | 1/2008 | Locke |
| 2008/0028064 A1 | 1/2008 | Goyal et al. |
| 2008/0040501 A1 | 2/2008 | Harrang et al. |
| 2008/0046544 A1 | 2/2008 | Sakoh et al. |
| 2008/0140720 A1 | 6/2008 | Six et al. |
| 2008/0140860 A1 | 6/2008 | Balassanian |
| 2008/0177819 A1 | 7/2008 | Reshef et al. |
| 2008/0177860 A1 | 7/2008 | Khedouri et al. |
| 2008/0215436 A1 | 9/2008 | Roberts |
| 2008/0320543 A1* | 12/2008 | Wang ............ H04N 7/162 725/131 |
| 2009/0006624 A1 | 1/2009 | Alkove |
| 2009/0022123 A1 | 1/2009 | Bae et al. |
| 2009/0024749 A1 | 1/2009 | Harrang et al. |
| 2009/0171762 A1 | 7/2009 | Alkove |
| 2009/0182662 A1 | 7/2009 | Alkove et al. |
| 2009/0299852 A1 | 12/2009 | Tsuchiya |
| 2011/0310806 A1 | 12/2011 | Karaoguz et al. |

FOREIGN PATENT DOCUMENTS

| | | |
|---|---|---|
| CN | 101911053 | 12/2010 |
| CN | 1241921 | 7/2013 |
| EP | 2250578 | 11/2010 |
| JP | H1093949 | 4/1998 |
| JP | H10304334 | 11/1998 |
| JP | 2002077419 | 3/2002 |
| JP | 2002342218 | 11/2002 |
| JP | 2003289523 | 10/2003 |
| JP | 2003316913 | 11/2003 |
| JP | 2004254193 | 9/2004 |
| JP | 2004287471 | 10/2004 |
| JP | 2004537109 | 12/2004 |
| JP | 2007514208 | 5/2007 |
| JP | 2009522850 | 6/2009 |
| JP | 2010532638 | 10/2010 |
| JP | 2011509487 | 3/2011 |
| JP | 5462185 | 1/2014 |
| KR | 20070102373 | 10/2007 |
| KR | 201025532 | 3/2010 |
| KR | 2010113506 | 10/2010 |
| TW | 200903257 | 1/2009 |
| WO | WO-0054201 | 9/2000 |
| WO | WO0221367 A1 | 3/2002 |
| WO | WO-03036441 | 5/2003 |
| WO | WO-2007078503 | 7/2007 |
| WO | WO-2009006051 | 1/2009 |
| WO | WO-2009088611 | 7/2009 |

OTHER PUBLICATIONS

Sawarkar, "Digital Asset Management", May 22, 2001, DMSC@Cognizant, pp. 1-19.

"PCT Search Report and Written Opinion", Application No. PCT/US2008/085896, (dated Jul. 21, 2009), 10 pages.

Subramanya et al., "Content Management Using Personal Content Portfolios", 2006, IEEE, pp. 69-73.

Sawarkar, "Digital Asset Management", May 22, 2001, DMSC@Cognizant, pp. 19.

"Final Office Action", U.S. Appl. No. 11/771,923, (dated Oct. 18, 2010),22 pages.

"Final Office Action", U.S. Appl. No. 11/771,923, (dated Dec. 24, 2009),20 pages.

"Foreign Office Action", Chinese Application No. 200880022174.0, dated Jun. 15, 2011, 12 pages.

"How DRM-Based Content Delivery Systems Disrupt Expectations of "Personal Use"", http://www.law.berkeley.edu/clinics/samuelson/papers/other/p029-mulligan.pdf, (Oct. 2003), 14 Pages.

"Import/Export in Digital Rights Management", http://delivery.acm.org/10.1145/1030000/1029163/p99-safavi-naini.pdf?key1=1029163&key2=0846667711&coll=GUIDE&dl=GUIDE&CFID=17286036&CFTOKEN=40030580, (Oct. 2004), 12 Pages.

"Non Final Office Action", U.S. Appl. No. 11/771,923, (dated Jul. 9, 2009), 17 pages.

"Non-Final Office Action", U.S. Appl. No. 11/771,923, (dated May 5, 2010),20 pages.

"Non-Final Office Action", U.S. Appl. No. 11/968,193, (dated Aug. 1, 2011),21 pages.

"PCT Search Report and Written Opinion", Application No. PCT/US2008/067806, (dated Dec. 12, 2008),10 pages.

Bias, Randolph "User Interface Design, Transaction Measurement, and Usability Engineering for Digital Rights Managed Media on a Cluster of Authorized and Unauthorized Devices", retrieved from <http://domino.research.ibm.com/acas/w3www_acas.nsf/images/projects_03.04/ $FILE/bias_proposal.pdf> on Apr. 27, 2007,4 Pages.

"Final Office Action", U.S. Appl. No. 11/972,612, (dated Oct. 27, 2011),9 pages.

"Foreign Office Action", Chinese Application No. 200880124598.8, (dated Dec. 23, 2011),7 pages.

(56) References Cited

OTHER PUBLICATIONS

"Non-Final Office Action", U.S. Appl. No. 11/771,923, (dated Dec. 16, 2011), 23 pages.
"Non-Final Office Action", U.S. Appl. No. 11/771,923, (dated Jan. 31, 2013), 34 pages.
"Foreign Notice of Allowance", JP Application No. 2010-542229, dated Dec. 18, 2013, 3 pages.
"EP Search Report", European Application No. 08869985.5, dated Jul. 19, 2013, 6 Pages.
"Final Office Action", U.S. Appl. No. 11/968,193, dated Apr. 10, 2014, 10 pages.
"Notice of Allowance", Chinese Application No. 200880124598.8, (dated Apr. 9, 2013), 6 Pages.
"Final Office Action", U.S. Appl. No. 11/771,923, (dated Jul. 24, 2012), 23 pages.
"Foreign Office Action", European Application No. 08771693.2, (dated May 8, 2012), 1 page.
"Foreign Office Action", Japanese Application No. 2010-542229, (dated Aug. 7, 2013), 11 Pages.
"Non-Final Office Action", U.S. Appl. No. 11/968,193, (dated Sep. 13, 2013), 8 pages.
"Foreign Office Action", Chinese Application No. 200880124598.8, (dated Sep. 24, 2012), 7 pages.
"Extended European Search Report", European Patent Application No. 08771693.2, (dated Apr. 20, 2012), 6 pages.
"Final Office Action", U.S. Appl. No. 11/968,193, (dated Feb. 29, 2012), 21 pages.
"Foreign Office Action", Chinese Application No. 200880022174.0, (dated Mar. 22, 2012), 9 pages.
"Statement in Accordance with the Notice from the European Patent Office dated Oct. 1, 2007 Concerning Business Methods", OJ EPO Nov. 2007, 592-593, (Oct. 1, 2007), 1 page.
"Foreign Notice of Allowance", JP Application No. 2010-542229, dated Dec. 18, 2013, 4 pages.
"Foreign Office Action", KR Application No. 10-2010-7014992, dated Mar. 30, 2015, 10 pages.
"Foreign Office Action", EP Application No. 08869985.5, dated Mar. 12, 2015, 7 Pages.
"Non-Final Office Action", U.S. Appl. No. 11/968,193, dated Oct. 1, 2015, 11 pages.
"Foreign Office Action", KR Application No. 10-2010-7014992, dated Oct. 30, 2015, 5 pages.
"Office Action Issued in European Patent Application No. 08869985.5", dated May 23, 2018, 4 Pages.
"Office Action Issued in European Patent Application No. 08869985.5", dated Sep. 22, 2017, 4 Pages.

* cited by examiner

FEDERATED ENTERTAINMENT ACCESS SERVICE

BACKGROUND

Users enjoy entertainment content in many different ways. Users can enjoy content in ways dictated by a traditional content distributor such as a radio station or movie theater, for example, by listening to songs on the radio or watching movies in the theater. When users listen to the radio they don't pay a fee but they often have to listen to advertisements. When users watch a movie in a theater, they usually pay a one-time fee. If they want to see the movie again, they pay again.

Users also enjoy content using physical media usually purchased from another type of content distributor, such as through purchasing songs on CD or movies on DVD. Users often buy content on physical media so that they can enjoy it when they want and as often as they want. Users have grown accustomed to this type of content distribution. They know-so long as their CD or DVD is not damaged—that they can enjoy the song or movie whenever they want and as often as they want. A teenager can listen to "Groove is in the Heart" 1,000 times if she wants. A movie buff can watch "Braveheart" or "Highlander" every night. Further, users have grown accustomed to the implicit benefits of buying content on a CD or DVD; they can lend "Braveheart" to a friend to watch or "Groove is in the Heart" to a classmate to play at a dance party. They can also enjoy the song or movie on whatever device they have that can play it; they can put their CD in their old, home CD player or their new mobile one simply by moving the CD from one player to the other.

More recently, users have been able to access entertainment content digitally, such as through subscription and pay-per-view services. These services have benefits but also disadvantages over buying content on physical media. The advantages include more-flexible ways to pay and use content, such as accessing content for a period of time, e.g., by subscribing to a service that allows them to play a particular song on their MP3 player for 30 days. Another flexible way is to pay to save or download content a certain number of times, e.g., "buying" a song to have a right to download it to a computer and then record/transfer it to other devices or storage as many as seven times. Still another way is similar to watching a movie in a theater in that a user pays once to enjoy the content once; e.g., to play a movie on his own TV once.

Some of these digital distribution services, however, do not permit users to enjoy entertainment content in the ways in which they have grown accustomed. Someone who in the past could buy a song on CD and play it on any CD player that she, a family member, or a friend owns, often cannot do so using these services. Also, many users do not trust the reliability and longevity of "owning" content through a service. If a person buys the right to a song, and thus can transfer or save it some number of times, the person may effectively lose that right if his computer storage fails or is stolen. A music fan could buy rights to thousands of songs and lose the right to use all of them if his computer hard drive fails. These are just some of the limitations present in many current digital content distribution services.

SUMMARY

This document describes tools capable of managing digital content from multiple content providers based on a user's identity. By so doing, the tools may free people from the limitations of their storage media and devices. The tools may perform these and other actions through an indirect relationship with users, such as when third-party content providers use the tools but provide their own direct interface with users.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 3 illustrates an example flow diagram showing the entertainment access service providing third-party content providers with selectable options by which they may decide on how their content will be used and/or paid for.

DETAILED DESCRIPTION

Overview

The following document describes tools capable of managing digital content provided by third-party content providers. This management may include ways in which to permit users to gain access to content with devices associated with them or even devices associated with others, like the user's friends or classmates. The tools may perform these and other actions through an indirect relationship with users, such as when third-party content providers use the tools but provide their own direct interface with users.

An environment in which the tools may enable these and other actions is set forth below in a section entitled Example Operating Environment. This is followed by another section describing example relationships and specifications devices may follow to interact with the tools; it is entitled Device Relationships. The next section describes some example ways in which third-party content providers may interact with the tools, entitled Third-Party Content Providers. This section is followed by a section entitled An Example Profile, which describes an example profile for a user. The next section, entitled Example Request, describes one way in which an entertainment access service may receive and respond to a request for access to entertainment content. Lastly, a section entitled Other Embodiments of the Tools describes and illustrates five processes for example embodiments of the tools, including ways in which the entertainment access service may respond to requests for access, alter profiles for users, and determine the effectiveness of particular advertisements, to name a few. This overview, including these section titles and summaries, is provided for the reader's convenience and is not intended to limit the scope of the claims or the entitled sections.

Example Operating Environment

Before describing the tools in detail, the following discussion of an example operating environment is provided to assist the reader in understanding some ways in which various inventive aspects of the tools may be employed. The environment described below constitutes one example and is not intended to limit application of the tools to this or any particular operating environment. Other environments may be used without departing from the spirit and scope of the claimed subject matter.

Figure 1:
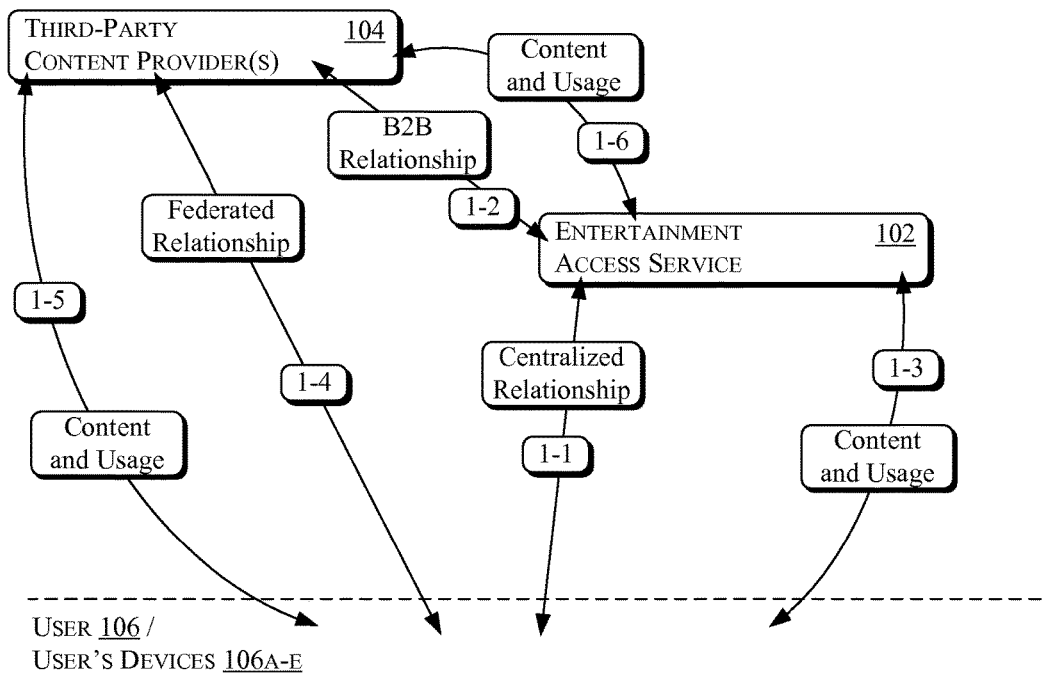
FIG. 1 illustrates an example operating environment having an entertainment access service, third-party content providers, a user, and devices associated with the user; this example operating environment is one in which various embodiments of the tools may operate.
Figure 1:
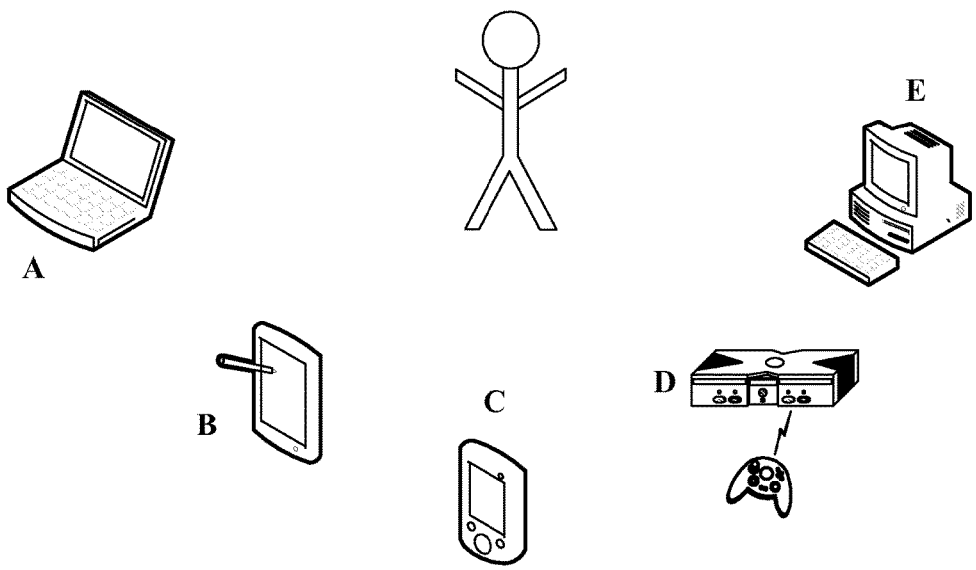

FIG. 1 illustrates one such operating environment generally at 100 having an entertainment access service 102, third-party content providers 104, a user 106, and devices 106A-106E associated with the user.

This particular environment illustrates very generally two manners in which the entertainment access service may operate; a centralized manner and a federated manner. In the centralized manner the entertainment access service has a direct relationship with a user—the user interacts with the entertainment access service directly, such as through the entertainment access service's website in which they select content, preferences, associate devices, or make payments. This centralized relationship is shown at arrow 1-1 in FIG. 1. In this manner content is received by the entertainment access service from the third-party content providers based on business-to-business relationships with those providers (shown with an arrow entitled "B2B Relationship" and marked 1-2) and then usually provided by the entertainment access service directly to the users (shown at 1-3).

In the federated manner, the entertainment access service manages content for users but often behind the scenes. The user's direct interactions are instead usually with the third-party content providers (shown at 1-4). Users may select content, preferences, associate devices, or make payments directly with the third-party content providers. The third-party content providers interact in a business-to-business relationship with the entertainment access service (again shown with the arrow entitled "B2B Relationship" at arrow 1-2), such as to provide information about the user, the content needed or already provided, and the like. Here the entertainment access service may provide content directly to the user and receive usage information directly back (arrow 1-3) or the third-party content provider may do so (arrow 1-5) and then indicate this usage and provided content to the entertainment access service (arrow 1-6).

In either manner, the entertainment access service acts to manage digital content based on a user's identity. The entertainment access service may do so in part by storing content and rights associated with that content (e.g., licenses) and/or by managing such content and rights stored remotely (e.g., with content stored at a remote entity or even at the third-party content provider that provided the content).

The entertainment access service, for example, may manage a user's usage rights to entertainment content and thus how the user is permitted to use the entertainment content, whether operating in a federated or centralized manner. Based on a user's identity, for example, the entertainment access service may determine that a user may download a song to a particular device, in what file format, in what resolution format, for how long the song may be played by that particular device, at what cost, and track when and how often the user plays the song on that device. The entertainment access service does so in part through relationships with the user's devices. These relationships will be described in detail and illustrated in FIG. 2.

The user does not have to be a single person. User 106 may include a group of persons. The persons may be grouped by all of them having access to one or more of devices 106A-E. The persons also may be grouped by living in a same household (e.g., a user representing a group including Dad, Mom, and the kids). If the user is a group of persons, the identity associated with the user may be the identity of each member of the group or a common identity for all members of the group (e.g., an access code and account number).

The content may be any type of digitally-distributable content, such as entertainment content. This content may include, by way of example, songs, music videos, movies, television shows, still images, and gaming software.

Device Relationships

Figure 2:
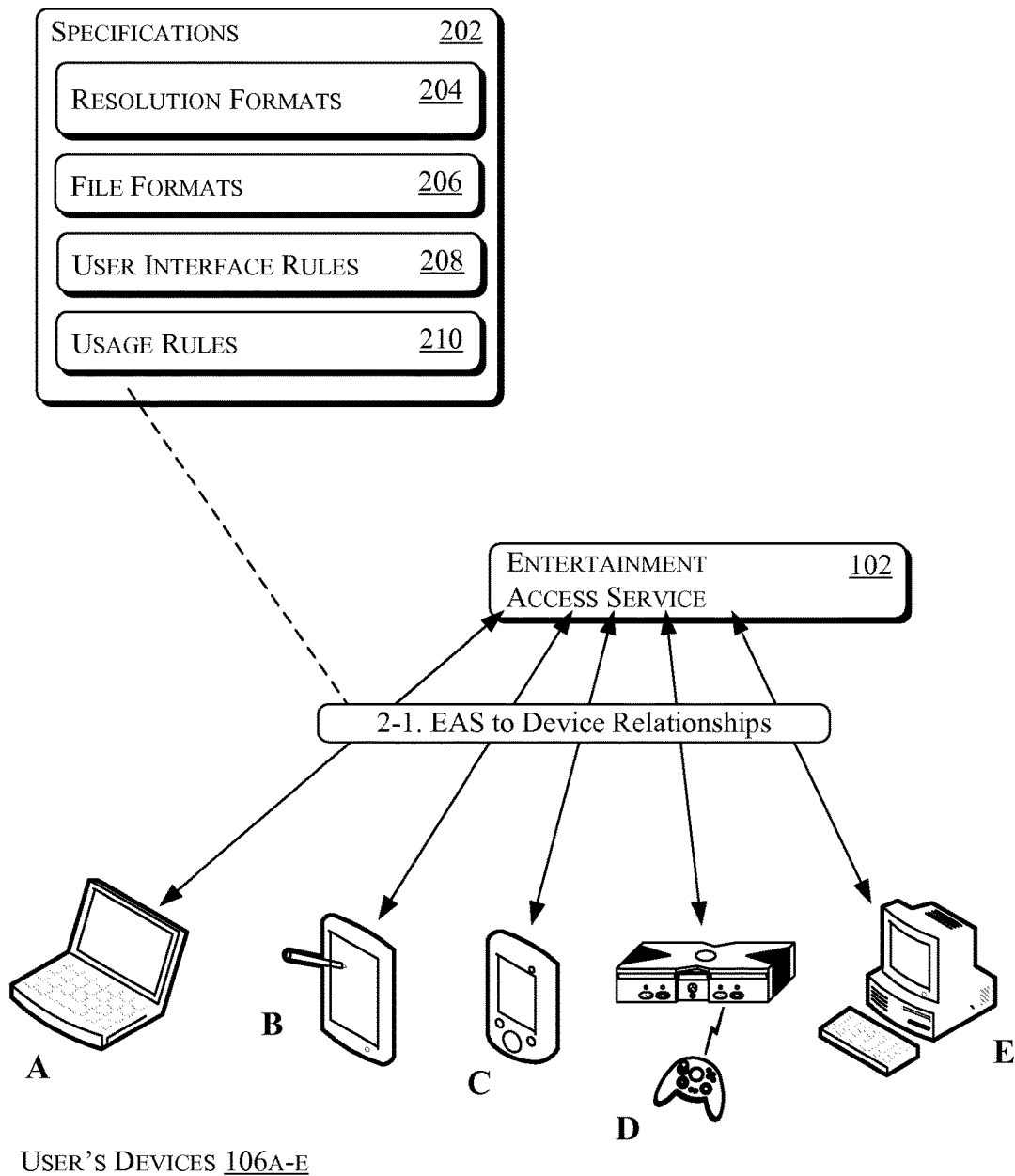
FIG. 2 illustrates example relationships between an entertainment access service and various devices (and their manufacturers), as well as example pre-set specifications that the devices follow to interact with the entertainment access service.

FIG. 2 illustrates example relationships between the entertainment access service and various devices (and their manufacturers). FIG. 2 also shows example specifications that the devices follow to interact with the entertainment access service.

Arrows 2-1 represent relationships between the entertainment access service and the devices and/or their manufacturers. The devices follow specifications 202 in order to interact with the entertainment access service. In this example the specifications include resolution formats 204, file formats 206, user interface rules 208, and usage rules 210, any of which may be pre-set by the entertainment access service and selected from by the third-party content provider. The resolution formats may include, by way of example, a low resolution format, a medium resolution format, and a high resolution format.

Also by way of example only, the low resolution format may be a maximum resolution capable of being rendered by a cellular phone having less than a two-inch-by-two-inch display, the medium resolution format may be a maximum resolution capable of being rendered by a non-high definition, four-by-three aspect ratio display having less than a fifty-two-inch hypotenuse-measured screen, and the high resolution format may be a maximum resolution capable of being rendered by a device capable of rendering at full resolution a high definition digital video disk (HD DVD™) or Blu-Ray™ DVD, to name just a few resolution format possibilities.

The file formats may include, also by way of example only, JPEG, WAV, WMP, MP3, DVD, HD DVD™, WMA, WMV, MP4, M4A, MP4, and Blu-Ray™ DVD.

Each relationship also includes various specifications on how a device should act and interact, such as generating a particular user interface or menu structure (e.g., consistent with all other devices that work with the entertainment access service) when rendering content provided by the entertainment access service. These are shown as user interface rules 208. The user interface rules may require that each device be capable of interacting with users having a same look and feel to its interface, such as have a same menu with same graphical icons incident with rendering content.

These specifications may also include usage rules 210, which may govern how a device is to render entertainment content, when, how often, when to cease doing so, track usage information, track advertisements accompanying or otherwise provided by the entertainment access service (or a third party with a relationship with the entertainment access service), how to render and a requirement to render advertisements in a certain way, and the like. Thus, the entertainment access service may require that devices provide a consistent user interface for entertainment-access-service content, track usage, track and render advertisements, and communicate this information to the entertainment access service.

The entertainment access service may also require that each particular device (rather than all devices of a particular type from a particular manufacturer) have a unique identifier. This identifier may later be used by the entertainment access service to associate the device with a user or identify the user.

Through the relationship with the manufacturer of cell phone device 106C, for example, the entertainment access service may require—and the manufacturer may cause the device to be capable of—using the pre-set low resolution format described above, providing a user interface consistent with other user interfaces for entertainment access service content, rendering advertisements, tracking usage (including advertisement usage), only rendering content when permitted to do so by the entertainment access service, and providing usage and advertisement interaction information back to the entertainment access service.

Third-Party Content Providers

Figure 3:
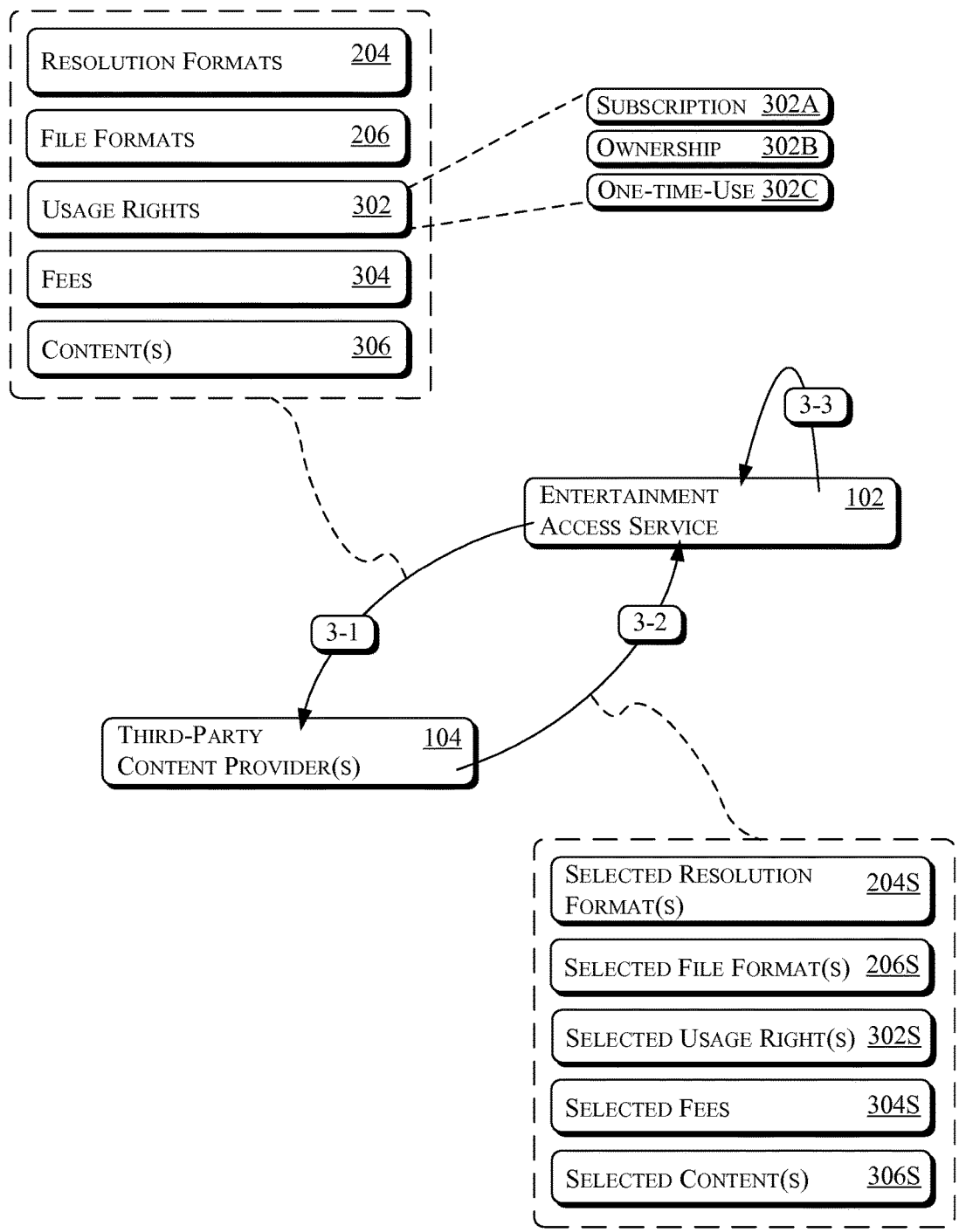

FIG. 3 illustrates an example flow diagram showing the entertainment access service providing third-party content providers with selectable options by which they may decide on how their content will be used and/or paid for. As will become apparent, the entertainment access service enables third-party content providers, whether the entertainment access service is operating in a centralized or federated manner, to choose various business and content options.

At arrow 3-1, entertainment access service 102 enables multiple third-party content providers to select from the resolution formats 204 (first shown in FIG. 2), the file formats 206 (also from FIG. 2), usage rights 302, fees 304, and indicate content(s) 306 that will be made available and that will be subject to the selected formats, rights, and fees.

Examples of resolution and file formats are described in FIG. 2. In this FIG. 3, three example usage rights are selectable, a subscription-based usage right 302A, an ownership-based usage right 302B, and a one-time-use usage right 302C (this one-time usage right may in effect actually be a time-limited usage right, such as 24 hours, in which the user may use content once, twice, or not at all). The fees for each may vary or depend on whether an advertisement is included. In a federated manner of operation the fees may not be relevant if all billing and fees are managed by the third-party content providers. In a centralized manner the fees may be chosen by the entertainment access service or the entertainment access service and the third-party content providers together as part of their business relationship.

At arrow 3-2, each third-party content provider provides selected content 306S (or indicia thereof) that will be managed by the entertainment access service based on selected formats 204S and 206S, selected usage rights 302S, and selected fees 304S for that selected content. If the third-party content provider selects more than one resolution format or file format for the content, the entertainment access service may later decide which of these to use for content based on the device itself or preference of the user.

At arrow 3-3, the entertainment access service associates selected content with the selected formats, usage rights, and/or fees. For example, a third-party content provider may provide music-video entertainment content and select for that content: a low resolution format; three file formats that the third-party content provider will provide the content in and with which devices may render the music videos; and the subscription usage right with two different fees, one with advertisement and one without. The fee with advertisement may be zero or non-zero (to the user) but generally less that the fee without advertisement.

Thus, at this point the entertainment access service has an indication of which content is at issue (for example any music video in the third-party content provider's library), the low resolution format, the three file formats available, and a subscription service fee of $4.95 per month for up to 100 music videos without advertisement and $0.95 for access and use of up to 100 music videos per month with advertisement.

With this set out a user may then download a music video of "Groove is in the Heart" to her cell phone and her PDA and, if she selected advertisements, watch the video as much as she likes on her cell phone and PDA for a month as part of her $0.95-a-month subscription fee, though she may have to watch a short advertisement before the video plays. After the month is up, the devices may both stop playing the video unless the entertainment access service indicates that she has re-subscribed. How a user may use the entertainment access service is described in more detail below. This simplistic example is just to give the reader an idea of some of the entertainment access service's capabilities.

Any of the above may be performed for many different third-party content providers and for various different contents for each of the different third-party content providers. Thus, one third-party content provider may select different formats, rights, and fees for some content than other content.

As noted above, the entertainment access service manages content based on a user's identity. In the below example embodiment illustrated in FIG. 4, the entertainment access service uses a profile associated with a user to manage content for that user as well as track the user's usage, preferences, and other information.

An Example Profile

Figure 4:
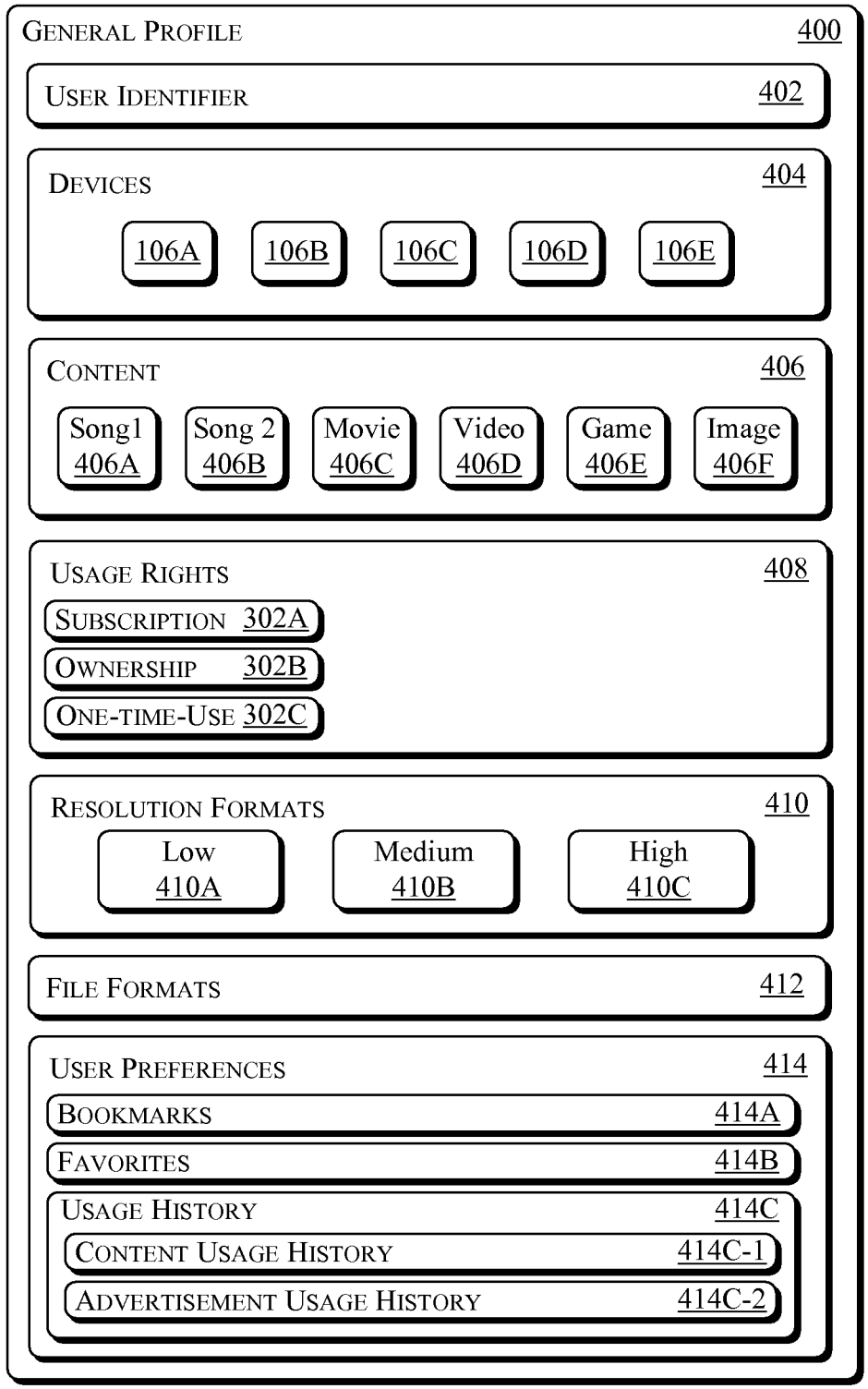
FIG. 4 illustrates an example profile for a user.

FIG. 4 illustrates an example of a profile at 400. Other examples of profiles and ways in which profiles may be built, altered, and used by the entertainment access service, users, and third-party content providers are discussed below as well. This particular profile 400 is simply one example of many different profiles and profile structures usable by the entertainment access service to manage content, track advertisements, correlate information based on user demographics, and maintain other information.

This profile includes a user identifier 402, information about various devices 404, content 406, usage rights 408 associated with that content, resolution and file formats 410 and 412 for each content, as well as user preferences 414. The devices include five different devices, here 106A-E shown in FIG. 1. The content includes six different entertainment content, two songs 406A and 406B, a movie 406C, a music video 406D, a computer game 406E, and a still image 406F. The usage rights include three usage rights, here subscription 302A, ownership 302B, and one-time-use 302C illustrated in FIG. 3, each associated with one or more of the content. The resolution and file formats include three resolutions (low 410A, medium 410B, and high 410C) associated with content and various file formats not shown for simplicity. The user preferences include bookmarks 414A, favorites 414B, and usage history 414C. Bookmarks and favorites are explicitly selected by the user. The usage history is built based on the user's actions (e.g., what content was rendered and when, etc.) and other information about the user.

The usage history may include a record of which contents the user has viewed, when, and how often (a content usage history 414C-1). It may also include a record of advertisements viewed, when, how often, and actions performed by the user in response to the advertisements (an advertisement usage history 414C-2).

The profile may contain a wealth of information, such as information sufficient information to determine that a request for content received from some entity or device is actually from a particular user (e.g., the user associated with the profile). This may be enabled by the entertainment access service having a unique identifier associated with a device and a request coming from that device with that unique identifier included with the request. The profile may also include the user identifier 402, which may be independent of the devices, such as an account number and password.

The associations between content and usage rights are not explicitly shown in the profile for simplicity, but the profile may indicate, for example, that movie 406C can be rendered by device 106A with a medium resolution format, device 106C with a low resolution format, and 106E with a high resolution format. It may also indicate that the movie has one-time-use usage rights 302C permitting the user to download it to device 106A in low resolution for $1.00, device 106C in medium resolution for $2.50, or to device 106E in high resolution for $4.00. The devices can be constrained by the entertainment access service to then only permit any one of these devices to play the movie once.

The profile may also indicate a user preference (e.g., with a bookmark), to download the movie to a device (e.g., 106E) capable of playing the movie at high resolution but instead download it at medium resolution—perhaps because the user wants to transfer the movie to a friend's medium-resolution laptop for playing at his house later.

Thus, the profile may contain information for the entertainment access service to determine that a request for access to content is from the user associated with the profile, that the access requested is permitted or not, the device intended to render the content (e.g., device 106E or instead the user's friends laptop) and its being uniquely associated with the user, the file format or resolution format appropriate for that device, an advertisement of a group of advertisements more likely to be effective or well received by the user, and so forth. These and other capabilities will be addressed in greater detail as part of examples provided below.

Example Request

Figure 5:
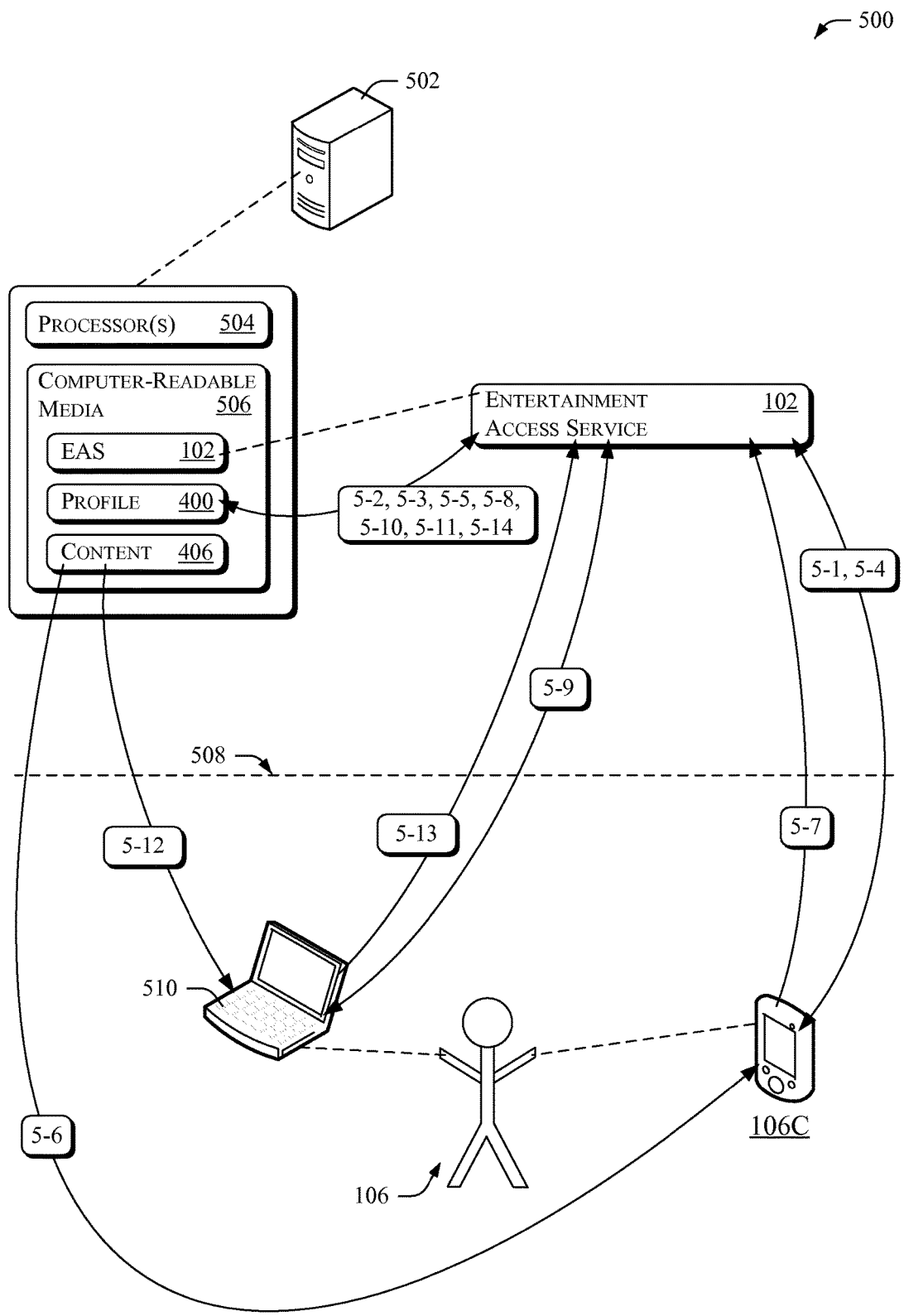
FIG. 5 illustrates an example flow diagram showing the entertainment access service interacting with a user.

FIG. 5 illustrates a flow diagram 500 showing the entertainment access service interacting with a user. This particular example illustrates ways in which the tools may act to manage a user's entertainment content. This example is an implementation of the tools but is not intended to limit the scope of the tools or the claimed embodiments.

The arrows described herein illustrate actions, interactions, and results of these actions and interactions. The arrows shown in FIG. 5 illustrate those of and between the elements shown in FIG. 5.

For this example the entertainment access service is a computer program residing on a computing device 502 having one or more processor(s) 504 and tangible computer-readable media 506. The computing device is shown with a server icon, though it may comprise one or multiple computing devices of various types. The processors are capable of accessing and/or executing the computer-readable media. The computer-readable media comprises or has access to entertainment access service 102 and profile 400 and content 406 (both of FIG. 4).

At arrow 5-1 the entertainment access service enables the user to request access (in conjunction with device 106C) to entertainment content and user 106 makes such a request. This request here includes information sufficient to determine the user's identity, such as an identifier uniquely identifying the user (e.g., an account number and password) or by the request being made from device 106C having a unique identifier stored in profile 400 and associated with the user.

The request is made across a communications network 508, here represented by a dashed line. The communications network may include a company intranet and/or a global network (e.g., the Internet) and may be wireless, wired, or a combination of these.

The request for access may be a request to render content already stored on a device, such as by the device asking the entertainment access service whether or not the user's monthly subscription has been paid and thus that rendering the content is permitted (e.g., if the user's request is received during a subscription period that is in force). The request for access may also request that content be downloaded for contemporaneous or later rendering.

By way of example, here we will assume that the user, through device 106C interacting with the entertainment access service, is requesting ownership rights to and downloading of a music video ("Groove is in the Heart") intended to be rendered (played) on this device. We will also assume that the user has already been a customer of the entertainment access service and thus has an associated profile.

At arrow 5-2 the entertainment access service determines that the request is from the user. Here the entertainment access service does so by finding the identifier for device 106C (which is unique to the device) in the request, determining that the device's identifier is recorded in the user's profile, and thus that the request is being made by the user.

At arrow 5-3 the entertainment access service determines whether or not the user has a right to the request—here to download this music video. The entertainment access service may do so based on usage rights associated with the user and the user's content (e.g., rights 302A to 302C in profile 400). In this example the entertainment access service determines that while the user has many rights to various contents, none of the user's usage rights are associated with this particular content. Thus, the user has not purchased an ownership right to this music video.

At arrow 5-4 the entertainment access service and the user interact sufficient for the user to gain the requested access, here by the user paying for and gaining an ownership right in the music video but at a reduced cost by the user selecting ownership-like rights but with an advertisement to be played before each rendering of the music video. Responsive to this, the entertainment access service updates profile 400 at arrow 5-5 to indicate that the user has an ownership-like right in the music video of "Groove is in the Heart."

At arrow 5-6, the entertainment access service permits the access, which here includes downloading the music video to device 106C with an advertisement in resolution and file formats indicated as appropriate for that device in the profile.

The user is now able to play the music video on device 106C. Responsive to the user playing the music video, the device 106C uploads at some future or incident time usage information to the entertainment access service. Here we assume that the usage information indicates that the user played the music video at a particular time, played it just after playing another dance music video and the name of that video, that after playing the music video the user selected to play another music video from the same artist, that the user did not perform any actions in response to the advertisement rendered with the video, or that the user commanded the device to cease rendering the advertisement (e.g., because the user hates watching it).

The entertainment access service receives this usage information at arrow 5-7. Responsive to receiving this information, the entertainment access service updates profile 400 at arrow 5-8. Based on this and other updates to the profile the entertainment access service may learn about the user's likes and dislikes, reaction to particular advertisements, and the like.

At arrow 5-9 the user makes another request, here again to download "Groove is in the Heart". Here, however, the request is received from a device not associated with the user (not devices 106A-E). If it were received by a device that is associated with the user the entertainment access service would, if the number of downloads permitted by the ownership right had not been met, permit download of the music video. Here, however, the user is attempting to download the music video to a friend's laptop 510 that is not associated with the user.

In this case the entertainment access service attempts to determine from whom the request is being made. Here the entertainment access service provides (through the device) a user interface for the user to enter an account and password uniquely associated with the user (all part of arrow 5-9). Responsive to receiving this information the entertainment access service determines that the request is from the user associated with profile 400 at arrow 5-10.

At arrow 5-11 the entertainment access service determines, based on the profile, that the user has a right to download the music video, and so downloads the video with advertisement (at arrow 5-12) to the user's friend's laptop 510.

Responsive to this second request by the user and the information garnered during the process (some received in an upload of usage information at arrow 5-13), the entertainment access service updates the user's profile at arrow 5-14 to indicate that the friend's laptop (already known to be owned by the friend, such as by the friend having a profile), is not the user's device but that the user is associated with the friend. Also, the entertainment access service updates the profile to indicate that the user has one less download permitted by the user's ownership right in the video.

As may be apparent even with this relatively simple example, the entertainment access service may provide access to entertainment content to a user based on the user's identity to the user's devices or even to a friend's device. Further, the entertainment access service may continually update the user's profile based on usage information and even that the user is associated with another person and thus that other person's usage history and preferences. This wealth of information may enable the entertainment access service to better understand what advertisements are appropriate for the user, such as by the user and the user's friend loving dance music and being of a certain age (and other demographic information). Based on this information (e.g., a demographic profile) the entertainment access service may require the user's devices to play the music video with an advertisement directed to young women (e.g., an advertisement for "Young Miss" magazine or a cosmetic). The entertainment access service would then likely forgo advertisements for SUVs or investment companies.

Other Embodiments of the Tools

The above sections provide examples of interactions between the entertainment access service, third-party content providers, devices, and users. In this section, other embodiments of the tools are described, some of which are more general than those previously described.

These example embodiments are described as part of processes 600, 700, 800, 900, and 1000 of FIGS. 6, 7, 8, 9, and 10, respectively. These processes and the example processes and flow diagrams described or illustrated in FIGS. 1 through 5 may be implemented in any suitable hardware, software, firmware, or combination thereof; in the case of software and firmware, these processes and flow diagrams represent sets of operations implemented as computer-executable instructions stored in computer-readable media and executable by one or more processors. These embodiments of the tools described in this section are not intended to limit the scope of the tools or the claims.

Block 602 enables multiple third-party content providers to select from a group of resolution formats, file formats, usage rights, and/or fees and for which content or type of content each selection applies. The tools enable third-party content providers to decide how they want to distribute content and for each type or particular content. As described in an example above, the entertainment access service may permit a third-party content provider to select a medium resolution format for a movie and its rights, as well as a particular fee, and even permit a different fee for the same movie at a different resolution.

Block 604 receives various entertainment content or indicia thereof from third-party content providers and a selection of one or more formats, rights, and/or fees associated with each content or content type. Examples of this are provided in FIG. 3. Note that content may be received at various times (before or during process 600) and from various sources, including a memory device with content provided by plugging it into a rendering device or otherwise used to download content directly to the rendering device, or from a remote source over a communications network whether that remote source is a third-party content provider, some other party, or the entertainment access service.

Block 606 receives identities of rendering devices capable of interacting with users in prescribed or pre-set ways. These device identities are for devices capable of interacting with the entertainment access service or a third-party content provider to render content according to various usage rules and/or rights. In an example described above in FIG. 2, the tools required device manufacturers to render content in particular ways, track and provide various usage information, render advertisements, and enforce usage rules and/or rights. These identities may also include unique identities for each particular device, thereby helping enable the tools to associated particular devices uniquely with particular users.

Block 608 enables users to request or otherwise interact with the tools sufficient to request access to entertainment content. The tools may do so through user interfaces made consistent through relationships with various devices, or even (in a federated manner) through relationships with third-party content providers that provide consistent options, if not consistent user interfaces, for selecting contents and the like.

Block 610 receives a request to access one of more of the entertainment content noted above. The request may be received from a device associated with the user and across a communications network or otherwise. As noted above, if a profile for the user has the device uniquely associated with the user and the device has a unique identifier, the tools may use this information to determine from which user the request is made. In either case the tools receive information in the request or incident with the request sufficient to determine from which user the request was made.

Block 612 determines that the request is from a particular user having an associated profile. Example profiles are described in greater detail above. For the purposes of this process, the tools use a profile that is uniquely associated with a user (whether that user is a single person or a group) and records content to which the user has some right. The profile may contain much more, as the above examples indicate.

The tools may determine that the request is from a user based on the user entering a unique identifier (e.g., account number and password) or based on information received passively in the request related to information in the profile, such as with a unique identifier for the device from which the request is received being associated with the user in the profile.

Responsive to this determination, the tools at block 614 determine whether or not the user has a right to the requested access to the particular content. The tools may do so based on the user having previously paid for a subscription to a third-party content provider's content (from which the requested content is requested), or in other manners described above, such as based on a particular usage right being set forth in the profile and associated with the requested content.

In some cases, optionally at block 616, the tools may determine a format in which to provide or indicate to a third party to provide the content, assuming the request is to download content. The tools may do so based on information associated with a device intended to render the content or based on preferences, etc., both of which may be included in the user's profile. Thus, the tools may provide the content in a resolution format appropriate to a cell phone's small display and in a file format usable by that cell phone, for example.

At block 618 the tools permit the access requested if the user has a right to such access. If the request is received directly from the user and the tools have control of the content, the tools may download the content or otherwise indicate to the device intended to render the content permission to do so. If the request is indirect, as may be in the federated manner of operation for the entertainment access service described above, the tools may instead indicate to an intermediary permission to permit the access. One example of this is when the user makes a request through a third-party content provider, which in turn passes the request and identifying information for the user to the tools, at which time the tools determine if the access is permitted and indicate this to the third-party content provider. The third-party content provider may then permit the access.

Figure 7:
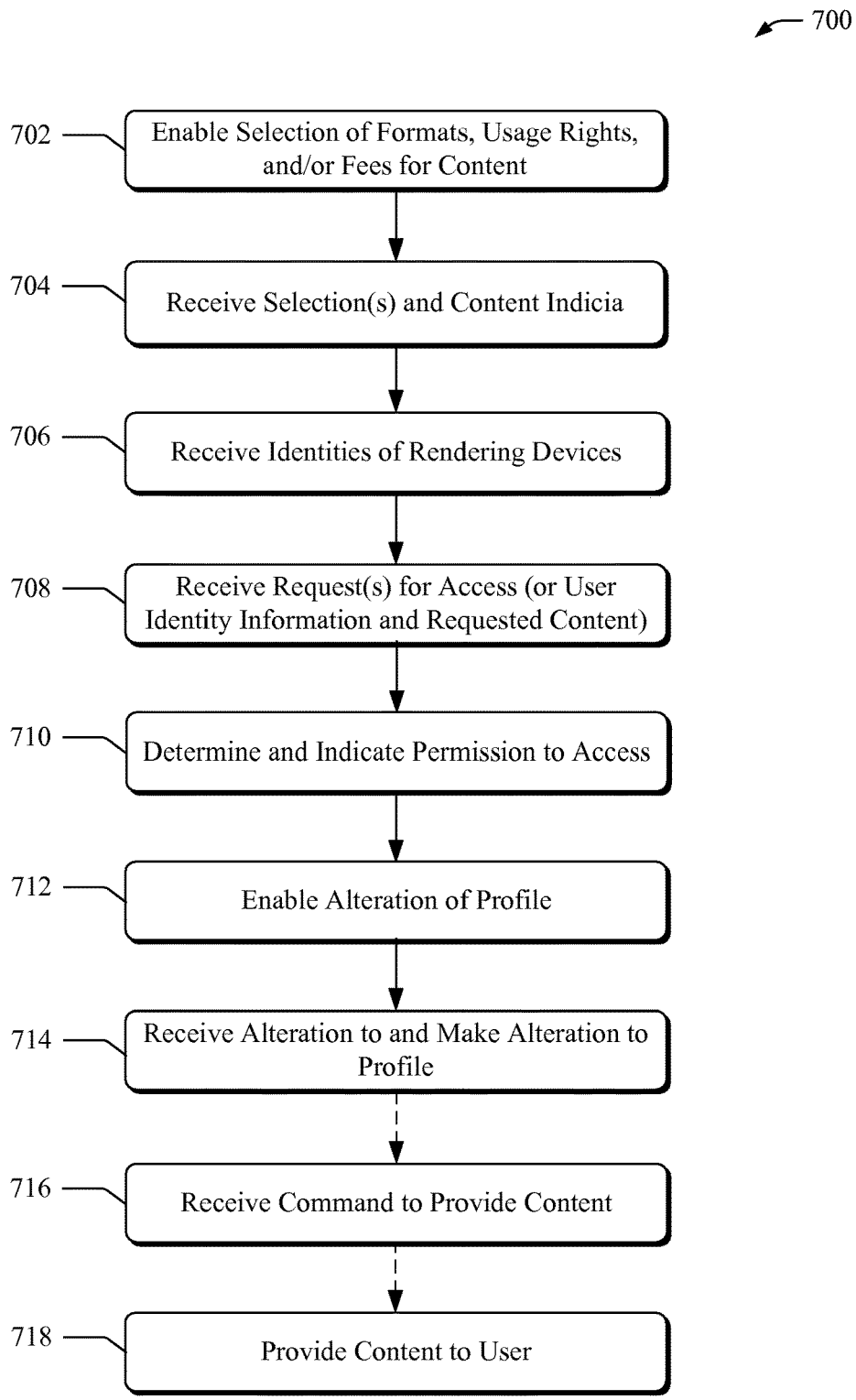
FIG. 7 is an example process illustrating some ways in which the tools may act and interact with devices, third-party content providers, and users effective to manage users' access to entertainment content directly and also indirectly through third-party content providers.

Process 700 of FIG. 7 provides another example embodiment of the tools related to a request for access being received from a third-party content provider.

Block 702 enables a third-party content provider to indicate entertainment content and select one or more of pre-set numbers of resolution formats, file formats, and/or usage rights to associate with the indicated entertainment content. Examples of this, including as set forth in process 600, are described above.

Block 704 receives, from the third-party content provider, an indication of the indicated entertainment content and, for the indicated entertainment content, one or more selected resolution formats, one or more selected file formats, and/or one or more selected usage rights. Again, examples of this are describe above.

Block 706 receives identities of rendering devices similar to as described at block 606 and the accompanying examples.

Block 708 receives, from the third-party content provider, information indicating a user's identity, and selection of the indicated entertainment content. If the third-party content provider selected more than one resolution format at block 704, block 708 may also receive from the third-party content provider an indication of which of the selected resolution formats is desired by the user or appropriate for the device intended to render the content. Likewise, if the third-party content provider selected more than one file format or usage right for the requested content at block 704, the tools at block 708 may receive an indication of which format or right.

Block 710 determines, based on a usage right associated with the user through the user's identity, that the user has the usage right needed to permit the access requested. The tools may do so by determining the user's identity, the user's profile, and the usage right associated with the requested content. Also at block 710, the tools may indicate this determination (e.g., that the user's requested access is permitted), including to the third-party content provider that sent the request or to a device intended to render the content. Other examples of these determinations are provided above. Responsive to this indication the third-party content provider may provide access to the content, or the device may permit the access (e.g., render a song already stored on the device once the entertainment access service indicates that the user's subscription is up-to-date).

Block 712 enables alteration of a profile uniquely associated with the user. As noted in various examples above, the tools (e.g., the entertainment access service), especially when operating in a federated manner, permit third-party content providers to access and alter a user's profile managed by the entertainment access service, this is shown received and performed in block 714. In so doing the entertainment access service manages a user's profile, rights, and the like, though it may also permit third-party content providers to interact with that profile.

Figure 6:
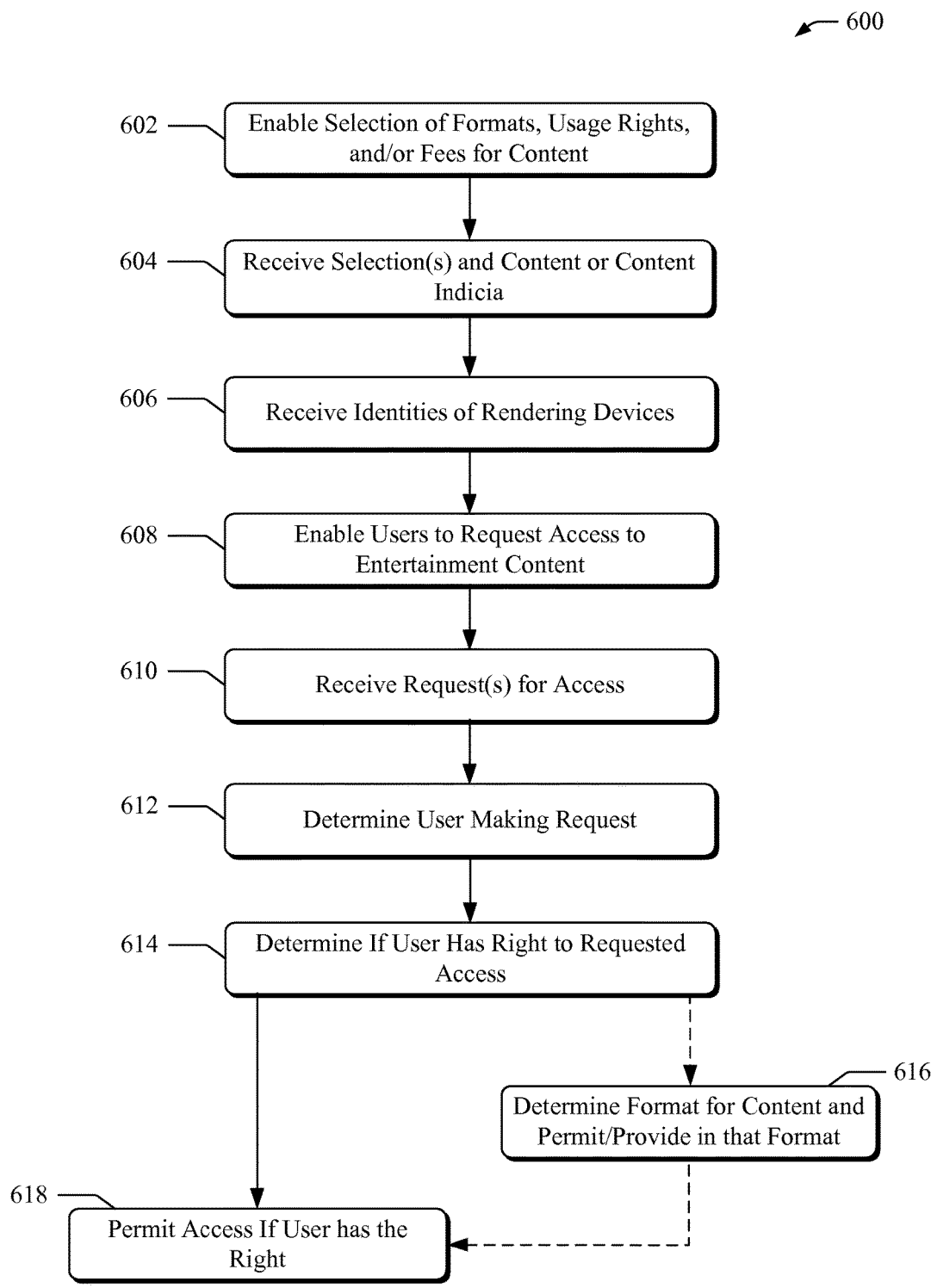
FIG. 6 is an example process illustrating some ways in which the tools may act and interact with devices, third-party content providers, and users effective to manage users' access to entertainment content.

Optionally, block 716 may receive a command from a third-party content provider to provide access to content. Third-party content providers may provide access on their own based on permitted usage rights indicated by the entertainment access service and based on the profile. In some cases, however, the third-party content providers do not provide access and instead delegate this to the entertainment access service. In such cases the entertainment access service at block 716 may receive a command and at block 718 provide the access commanded and act in any of the above ways (e.g., as illustrated in FIGS. 5 and 6) to provide access to users.

The above process 700 and any examples relating to this process above may be performed for many different third-party content providers. Thus, one third-party content provider may provide content to a user and another provide different content to the same user. Both may interact with and even have the ability (provided by the entertainment access service) to alter that user's profile. Thus, one profile for one user may be used to integrate the user's experience, preference, history, and the like regardless of the number of third-party content providers that the user receives content from.

Processes 600 and 700 may act jointly as well. The tools may thereby permit third-party content providers to select content, rights, formats, and the like and users may expressly select (e.g., via preferences in their profiles) which content, rights, formats, and the like that they want.

Figure 8:
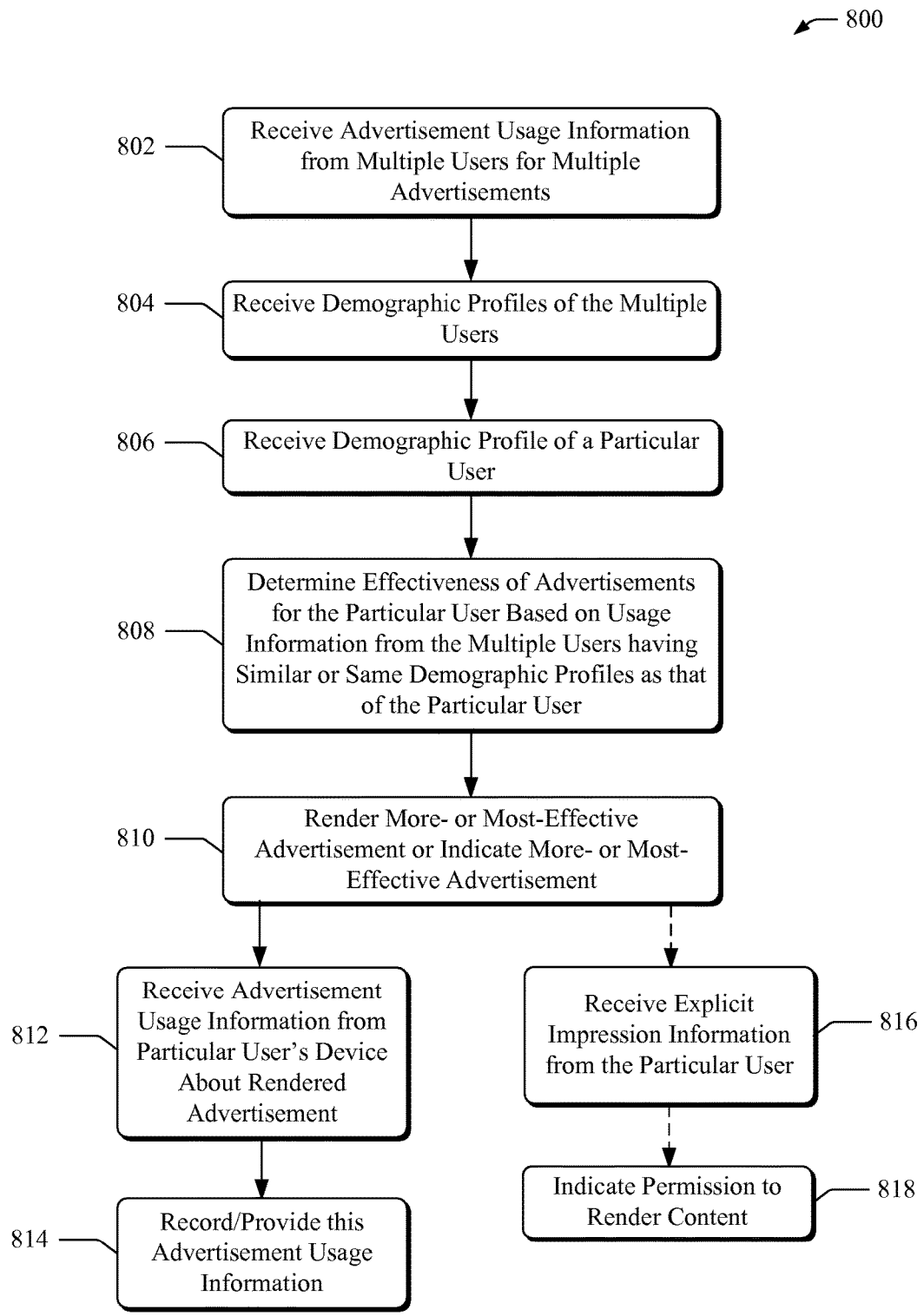
FIG. 8 is an example process illustrating some ways in which the tools may receive and use information concerning users and advertisements.
Figure 9:
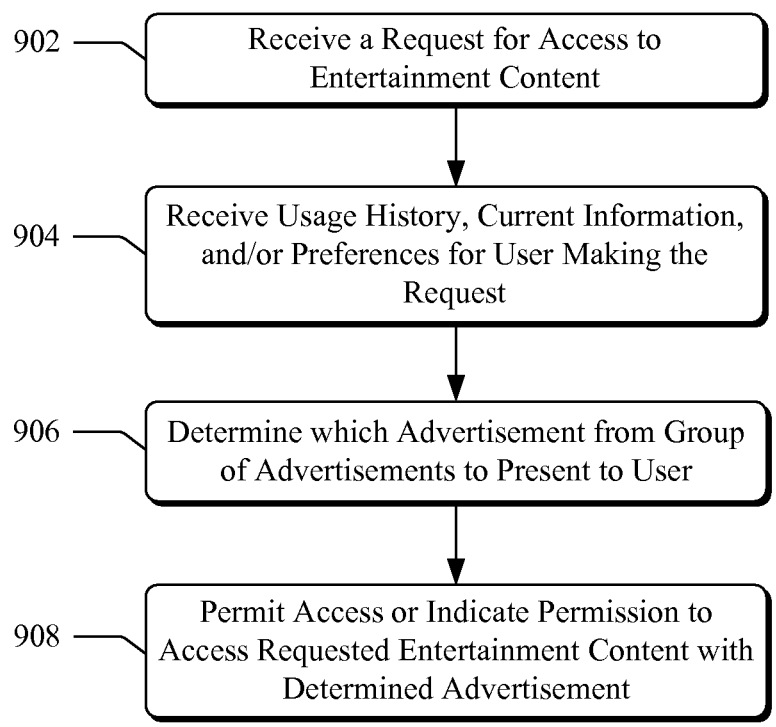
FIG. 9 is an example process illustrating some ways in which the tools may permit or indicate permission to access entertainment content based on a user's usage history.
Figure 10:
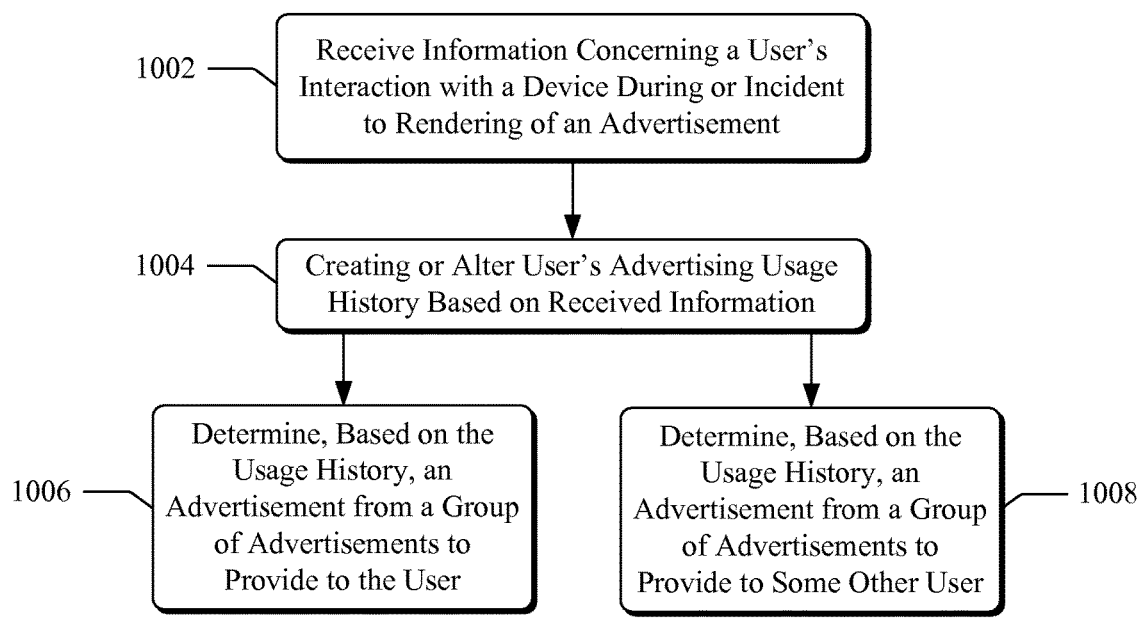
FIG. 10 is an example process illustrating some ways in which the tools may determine which advertisement from a group of advertisements to provide to a user.

Processes 800, 900, and 1000 of FIGS. 8, 9, and 10, respectively, provide other example embodiment of the tools, here related to advertisements. These processes and each of their acts may work alone or in conjunction with any other processes, acts, and examples set forth above as permitted by the context of such processes, acts, and examples.

Block 802 receives advertisement usage information from one or multiple users and for one or multiple advertisements. This information may include how various users have acted or interacted based on the advertisement, such as a user responding favorably to an advertisement by indicating explicitly that the user likes the advertisement, by selecting a website indicated in or accessed through the advertisement, and the like.

Block 802 may receive this information directly from users, directly from devices rendering advertisements or content, or indirectly, such as from third-party content providers collecting this information and providing it to the tools. The entertainment access service, for example, may receive this information from every device associated with a user (e.g., devices 106A-E of FIG. 1).

Block 804 receives demographic profile(s) of the one or multiple users. Demographic profiles include information that is useful in comparing users rather than unique information about users. Thus, a demographic profile of a user may indicate the user's age, sex, annual income, previous buying habits, race, what country he lives in, the city or type of city, marital status, and whether he has children and their ages. This demographic profile may also include each user's history with content and advertisements in a general way, such as if he likes or does not like science fiction, does or does not like certain types of advertisements or even particular advertisements, and the like. In one example, the demographic profile includes much of the information in general profile 400, such as the user's devices 404, content 406, usage rights 408, and user preferences 414 but not the user's unique identifier 402.

Block 806 receives a demographic profile for a particular user. Thus, the process at this point may have received information about how 150 people have reacted to 12 different advertisements and demographic profiles for those 150 people and the one particular user.

Block 808 determines the effectiveness of advertisements for the particular user based on the received information. Block 808 may do so by comparing the particular user's demographic profile with the demographic profiles of users that have viewed the advertisements. Continuing the above example, assume that the particular user is 25 years old, female, married, has one child, and lives in a big city in the United States. Assume also that 13 of the 150 people are between 24 and 30 years of age, are also female, are also married, have at least one child, and live in a moderate or big city in the United States or Canada. Based on the similarity of these 13 people with the particular user, this information may be useful in correlating these 13 people's reaction to advertisements with what may be an expected effectiveness of these advertisements on the particular user.

Thus, if the 13 people similar to the particular user acted favorably to two of the 12 advertisements, the tools may determine that these two advertisements are more likely to be effective than the other ten advertisements.

The tools may indicate its findings, such as by indicating the advertisement most likely to be effective at block 810 or may select to render the most or a more-effective advertisement, also at block 810.

Block 812 receives advertisement usage information from the particular user's device concerning the advertisement rendered. The device, as noted above, may record that the user played the advertisement more than once, selected a website through the device, interacted with the advertisement in some way, or explicitly indicated that she liked the advertisement in response to a query from her device.

Block 814 records this information. The tools may use the information to learn and develop usage histories and demographic profiles to better understand which advertisements are more effective with which kind of people, to charge advertisers more or less based on the advertisement's effectiveness, alter the user's general profile 400 for later use in determining what she will respond well to, and in other ways set out or inferred herein.

The tools may alter a user's profile based on this received information, or provide this information to advertisers to indicate how often their advertisement has been seen, when, by what age or other demographic of people, or other positive or negative interactions with the advertisement (like selecting to watch the advertisement again or commanding the device to stop rendering the advertisement).

In some cases the tools wait to receive explicit information from the particular user before permitting entertainment content to be accessed. In some other cases the tools receive such information but do not require it before permitting access to entertainment content.

The tools, also at block 814, may provide this information to third-party content providers or otherwise provide information relating to the effectiveness of advertisements based not just on user demographics but also on the type of content.

Assume, for example, that there are two television shows, the first is the "Super Bowl" (i.e., the National Football League playoff finals) and "The 4400" (a science-fiction program), both of which are shown on users' devices with advertisements. Assume also that the Super Bowl is viewed by ten (10) times as many people as The 4400.

Advertisers generally assumed that if one show (e.g., the Super Bowl) is watched by ten times as many people as another show (e.g., The 4400) that a commercial shown during the Super Bowl is ten times as effective as showing that commercial during The 4400. Advertisers have adjusted this assumption somewhat based on the type of person found to watch each program (usually through the Nielson Ratings), and so might consider the Super Bowl 11 times or 9 times more effective based on persons assumed to watch each program (e.g., that lots of 18-34 year-old men watch the Super Bowl and they generally have a lot of disposable income and so are more likely to buy the advertised products than those that watch another program). Using the number of persons watching a program and some general information about people watching them would then help advertisers and the content providers (here the NFL and the distributor of The 4400) to determine a price to charge for advertising time during the program.

The tools provide more data and more useful data—not just educated guesses based on how many people watch programs. The tools may indicate how well an advertisement is received based on the program. The tools may track, as noted elsewhere herein, users' interaction with an advertisement. The tools may also track this information based on the content with which an advertisement or type of advertisement is played.

Assume that the Super Bowl and The 4400 are rendered using the above-noted devices and for many users. The tools may track how various types or even particular advertisements did during the Super Bowl and The 4400 and compare these. A new car commercial for a fuel-efficient economy car, for instance, may have caused 20,000 people that watched the Super Bowl to select more information about the new economy car (e.g., by selecting a website through the advertisement). The same advertisement may have caused 4,000 people that watched The 4400 to select more information about the new car. Thus, even though 10 times as many people watched the Super Bowl for this advertisement (and presumably for similar advertisements) The 4400 was twice as effective as it was assumed to be (five times fewer interest rather than 10 times fewer interest). Based on this information provided to both content providers and advertisers, the content providers and advertisers may learn that the value of advertising time during The 4400 is worth much more than expected. They may also learn that people that watch The 4400 may want fuel-efficient cars, are perhaps more environmentally conscience, or may simply have less money (a $12,000 car is inexpensive) than those that watch the Super Bowl. In any case the information provided by the tools contains data usable in many valuable ways.

The information provided in the above example is often more useful for deciding on advertisements and pricing for the next Super Bowl or next episode of The 4400. But in many cases this information can be useful for the same exact content.

Some content will be played over and over again for years—such as music videos by Prince or Madonna. By tracking and providing information about how an advertisement does when played before a Prince and a Madonna video, much can be learned about the value of the advertisement, the value of both videos, and which advertisements to play during those particular videos in the future.

Block 816 receives such explicit impression information. This information may be a response to a query from the particular user's device to the users, such as a question "do you like this ad?" or "do you think this product is a good one or not?", at which point the user may select yes, no, or some sort of non-binary response.

Block 818 indicates permission to render the content only if explicit impression information is received, though this is not a mandatory act of process 800.

Generally, the tools may determine which advertisement to show based on the user, prior information about how well various types of advertisements do with a particular type of content, and/or for similar users or even that exact content. And, after learning more by using that determined advertisement, may alter which advertisement is played for a similar person watching similar content in the future. Or that, after learning more about this particular user, this user will respond better to other types of advertisements.

Block 902 of process 900 receives a request for access to entertainment content, such as any of those described above. The request may be received from a device associated with the user and across a communications network or otherwise. As noted above, if a profile for the user has the device uniquely associated with the user and the device has a unique identifier, the tools may use this information to determine from which user the request is made. In either case the tools receive information in the request or incident with the request sufficient to determine from which user the request was made.

Block 904 receives a usage history, current information, and/or preferences for the user making the request. Block 904 may receive information about the user's explicit preferences, e.g., bookmarks and favorites 414A and 414B of FIG. 4, or implicit preferences, e.g., some of those implied by content and advertising usage history also of FIG. 4.

The user making the request may be determined from the user's unique identifier or based on the requesting device's unique identifier. As noted above the usage history may be stored in profile 400, which is associated with the requesting user.

This usage history may include information about what content a user has rights to, how often and when he or she uses that content, demographics (implied or explicit) about the user (e.g., content usage history 414C-1). This usage history may also include advertisement usage history (e.g., 414C-2), which may include how a user interacts with advertisement, such as going to a website presented in the advertisement. The usage history may also comprise an interaction between a user and a particular advertisement. Many devices capable of rendering entertainment content are also capable of enabling users to interact with advertisements and track how a user acts in other ways useful to determining a user's behavior or likely reaction to other advertisements; the tools may track this information, even for many users.

Not only can this information include historical information, it may also include current information. In these cases the information may be included in, concurrently received with, or sent recently prior to a request for content. Or the information may be received periodically and the like. A user's device, for example, may include in a request for content a location of the device, such as a Global Positioning Satellite (GPS)-provided location. If a user's device to which content is to be rendered is in Paris, France, for example, the tools may determine to send an advertisement for local Parisian restaurants or for French-English language-translation software.

Block 906 determines which advertisement from a group of advertisements to present to the user based on the user's usage history or current information. Assume, for example that the requesting user's unique identity is his name: "Thurston Howell III" and his associated profile indicates that he loves sitcoms from the 70s (e.g., "Gilligan's Island") and that he responds favorably to advertisements for very expensive products and services. Based on this information, block 906 may determine that Thurston Howell III will not respond well to advertisements for zit cream or Chevrolets but will respond well to an advertisement for a private Lear Jet costing tens of millions of dollars. Instead or additionally, however, block 906 may learn that Thurston Howell III's device is on a remote island, and so instead play an advertisement to charter a boat.

Block 908 permits access or indicates permission to access the requested entertainment content with the advertisement determined to be most effective of the group of advertisements.

As an aside, the group of advertisements may be preselected or be all advertisements currently provided by a service having access to the requested entertainment content, or third-party content provider associated with the requested entertainment content, or may be one of a smaller group of advertisements already associated with that particular entertainment content. Thus, the group may be all advertisements or may be ten advertisements found to be effective generally with people that like "Gilligan's Island" or people that like this type of sitcom.

Turning to process 1000 of FIG. 10, block 1002 receives information concerning a user's interaction with a device during or incident to rendering an advertisement. As noted in examples above, a user may explicitly indicate his or her impressions of an advertisement or select a website or otherwise react to an advertisement. In this and other types of user interactions with a device much can be learned about this user's and other user's likely impression or effectiveness of other advertisements.

With this information, block 1004 creates or alters a user's advertising usage history based on the information. If, for example, the user turned down the volume on his MP3 player during the advertisement, block 1004 may indicate this in the user's profile, such as the user's advertising usage history. Block 1004 may also indicate in the user's profile (e.g., profile 400 of FIG. 4) that the user did not have a good impression of the advertisement based on his turning down the volume.

Block 1006 determines, based on the user's usage history, an advertisement to provide to the user. Assume that a user requests to see a music video from the entertainment access service described above. Assume also that the music video is not owned by the user but instead is one that requires an advertisement. The tools may indicate a group of advertisements that are approved for that content. The approval may be one based on cost—advertisers that pay enough for an advertisement to meet the demands of the music video's content owner, or may be associated by being of an appropriate age group (e.g., an 80s music video with an advertisement targeted to people born in the 70s). In any case, approved or not, block 1006 determines which advertisement or advertisements will likely be well received or effective with the particular user. This determination may be made based on one interaction by the user (e.g., one iteration of blocks 1002 and 1004) or based on many. The particular user may have interacted with many advertisements, which would likely provide more accurate information about the user than only one interaction.

This determination, in some cases, may involve more than determining which advertisement is likely the most effective advertisement from the group. It may rank the advertisements or otherwise provide some measure for many advertisements. This is helpful if other criteria are used to determine which advertisement to ultimately provide with the entertainment content, such as in some of the examples provided above. For example, if there are 80 advertisements that may be played with the content to permit access to the content, the tools may pick between advertisements in the top five of effectiveness and select the one of the five that other users also liked that have similar demographics, the one of the five selected by the user himself (e.g., enable the user to select which advertisement of the five to see with the content requested), or which of the five generates the highest income for the entertainment access service, the third-party content provider of that content, or the least cost to the advertiser. Other actions that may follow block 1006 are described in greater detail above.

Block 1008, additionally or alternatively to block 1006, determines, using the usage history for the user, an advertisement to provide to some other user. Block 1008 may do so, in one case, according to blocks 802, 804, 806, and 808. Block 1008 may also or instead do so based on a general effectiveness of the advertisement rather than an effectiveness correlated to similar demographic profiles. As noted in block 1006, the determination may be based on one or many interactions from the user. Also here though the determination of which advertisement(s) are effective or well received may be from more than based just on the user's usage history, but may be from other user's usage histories as well.

As noted above, the tools permit advertisers to target their advertisements based on who a user is, what a user likes, and even where a user is playing an advertisement. Further, the tools may permit advertisers to target their advertisements based on users having similar demographic profiles or even based on the content or type of content (e.g., Non-playoff NFL football compared to the Super Bowl or Star Trek compared to The 4400).

CONCLUSION

The above-described tools can help users enjoy and access their digital entertainment content even from multiple content providers. The tools can also help third-party content providers manage, sell access to, and control their content. Although the tools have been described in language specific to structural features and/or methodological acts, it is to be understood that the tools defined in the appended claims are not necessarily limited to the specific features or acts described. Rather, the specific features and acts are disclosed as example forms of implementing the tools.

The invention claimed is:

1. A method implemented by a computing device comprising:
   receiving, from a third-party content provider of one or more third-party content providers and by the computing device:
   an indication of a selected entertainment content;
   information indicating an identity of a user; and
   device identification information indicating an identity of a selected device to which the selected entertainment content is to be downloaded and on which the selected entertainment is to be played, the selected entertainment to be downloaded from the third-party content provider;
   determining, by the computing device and based on the device identification information of the selected device and a profile associated with the identity of the user, that the selected device matches device identification information contained in the profile of the user;
   determining, by the computing device, an advertisement to play with the selected entertainment content based on the profile associated with the identity of the user;
   determining, by the computing device and based on the identity of the selected device and the profile associated with the identity of the user, a resolution at which to play the determined advertisement and the selected entertainment content, the determined resolution matching a maximum resolution of the selected device; and indicating, by the computing device and to the third-party content provider, the determined advertisement to play and the determined resolution.

2. The method of claim 1, further comprising:

receiving, from the third-party content provider of the one or more third-party content providers and by the computing device:

a second indication of the selected entertainment content;

the information indicating the identity of the user; and device identification information indicating an identity of a second selected device to which the determined advertisement and the selected entertainment content are to be downloaded, from the third-party content provider, and on which the determined advertisement and selected entertainment are to be played;

determining, based on the profile of the user and by the computing device, that the second selected device is that of another user with whom the user is associated;

further determining, by the computing device and based on the identity of the second selected device and a profile associated with the identity of the user, a second resolution at which to play the determined advertisement and the selected entertainment content by the second selected device, the determined resolution matching a maximum resolution of the second selected device; and indicating, by the computing device and to the third-party content provider, the second determined resolution.

3. The method of claim 1, further comprising receiving a command from the third-party content provider to determine a right of the user to access the selected entertainment content and determining the right of the user to access the selected entertainment content responsive to receiving the command.

4. The method of claim 1, wherein the maximum resolution is a low resolution, a medium resolution, or a high resolution.

5. The method of claim 1, wherein the selected entertainment content comprises a song, music video, movie, television show, game software, or still image.

6. The method of claim 1, wherein the profile associated with the identity of the user is built and maintained by the computing device.

7. The method of claim 6 wherein the profile associated with the identity of the user includes specifications for one or more selectable devices associated with the user and obtained through a relationship between the computing device and the manufacturer(s) of the one or more selectable devices associated with the user.

8. The method of claim 7, wherein the specifications include one or more of resolution formats, file formats, user interface rules, or usage rules required to interact with the computing device.

9. The method of claim 7, wherein the profile associated with the identity of the user comprises usage history of the one or more selectable devices.

10. The method of claim 9, wherein the usage history indicates interactions with the one or more selectable devices by multiple users.

11. The method of claim 9, wherein the usage history includes volume changes initiated during previously determined and played advertisements.

12. The method of claim 1 wherein the computing device receives, from the third-party content provider, an indication of one or more of resolution formats, file formats, usage rights, or fees for the selected entertainment content.

\* \* \* \* \*